July 21, 1964 C. H. JONES 3,142,032
INTERLACED VIDEO DISPLAY OF SEA BOTTOM USING SONIC ENERGY
Filed March 7, 1962 3 Sheets-Sheet 1

INVENTOR
CHARLES HOWARD JONES

July 21, 1964  C. H. JONES  3,142,032
INTERLACED VIDEO DISPLAY OF SEA BOTTOM USING SONIC ENERGY
Filed March 7, 1962  3 Sheets-Sheet 2
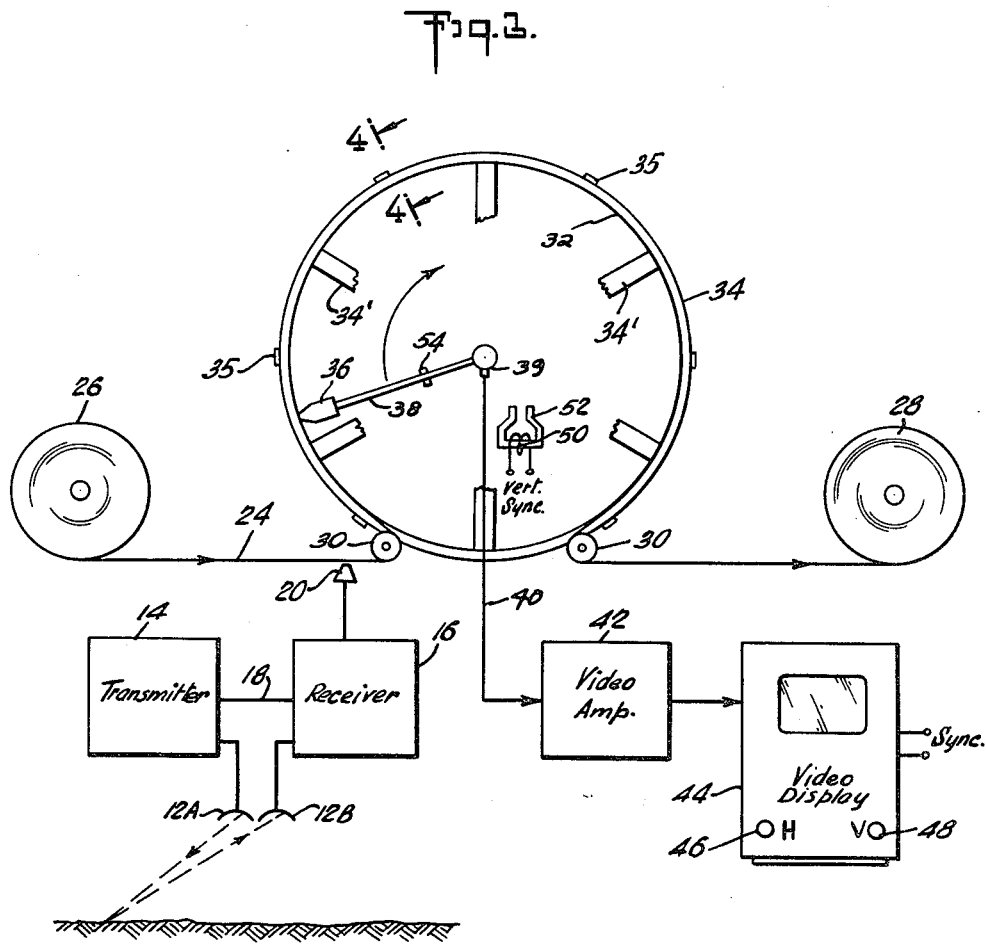
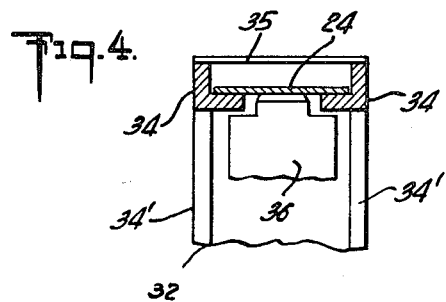
INVENTOR
CHARLES HOWARD JONES

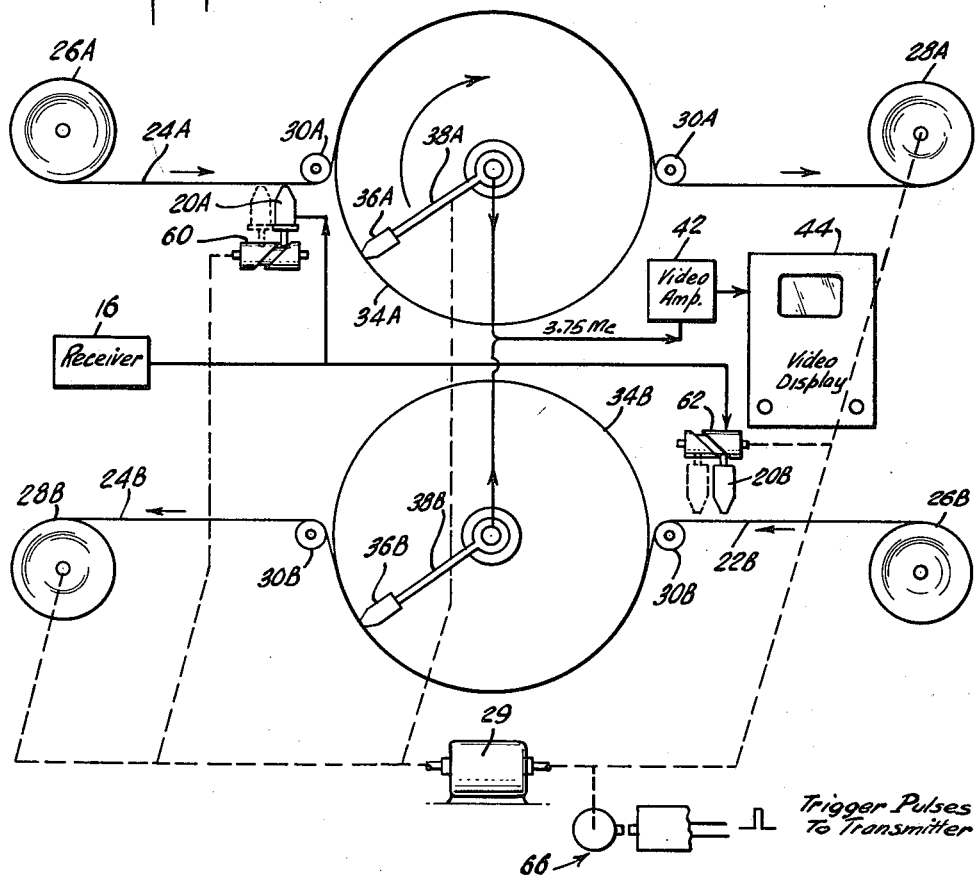
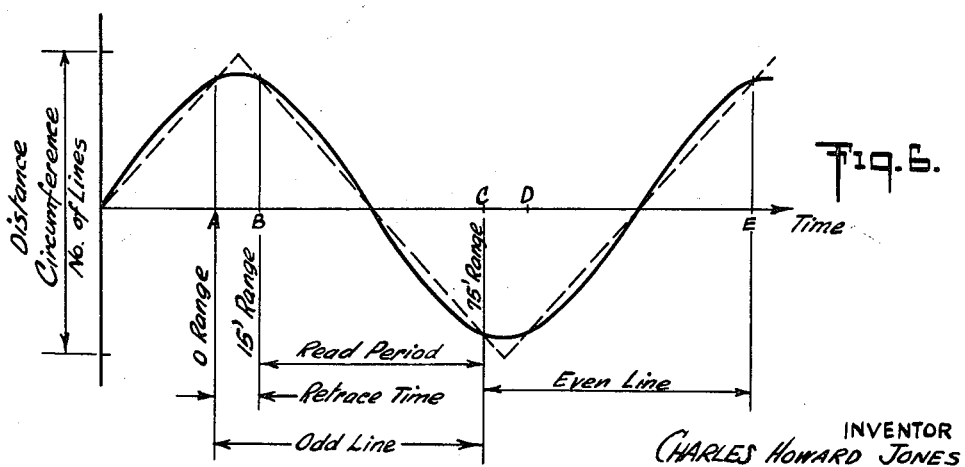

United States Patent Office 3,142,032
Patented July 21, 1964

3,142,032
INTERLACED VIDEO DISPLAY OF SEA BOTTOM
USING SONIC ENERGY
Charles Howard Jones, Murrysville, Pa., assignor, by
mesne assignments, to the United States of America
as represented by the Secretary of the Navy
Filed Mar. 7, 1962, Ser. No. 178,216
6 Claims. (Cl. 340—3)

This invention relates to imaging selected sea bottom areas on video apparatus through sonic illumination of the selected area.

An object of this invention is to obtain an interlaced video image of an area of sea bottom by irradiating selected sea bottom areas with sonic energy and intercepting some of the sonic energy reflected by the sea bottom and correlating and displaying the information in intercepted echoes on video equipment in a manner that affords a visual image of the sea bottom.

A further object is to obtain through sonics a video image of the sea bottom from a moving vessel that corresponds to the image that one would obtain if he could visually observe the sea bottom through a pipe directed toward the bottom and while the pipe was moved over a selected path over the sea bottom.

Other objects and advantages will appear from the following description of an example of the invention, and the novel features will be particularly pointed out in the appended claims.

Figure 1A:
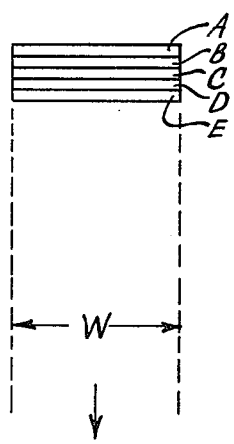
Figure 1B:
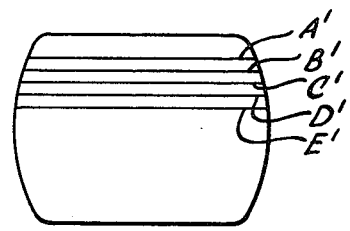
Figure 2:
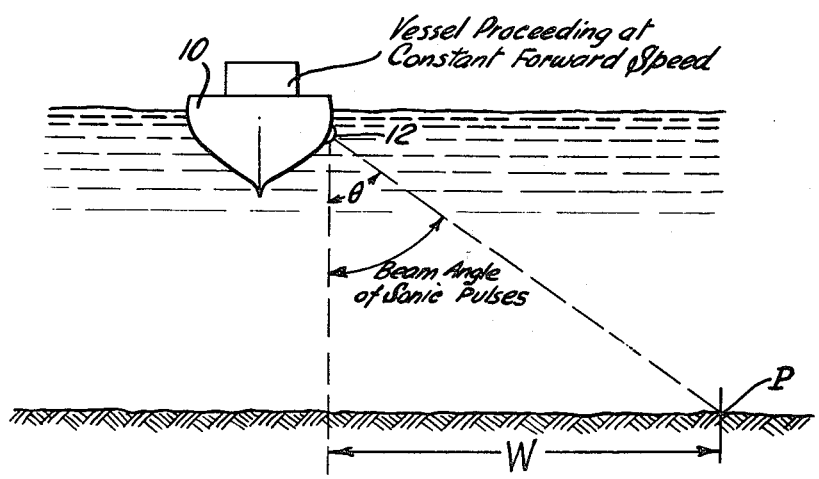

FIG. 1A is a diagrammatic showing of a strip of sea bottom divided into narrow, linear transverse areas, FIG. 1B is a video screen on which is shown horizontal linear images representing the transverse areas of sea bottom shown in FIG. 1A, FIG. 2 illustrates sonic pulse irradiation of separate sea bottom areas such as A, B, C, D, E of FIG. 1A and at spaced intervals from a vessel moving along parallel to the direction indicated in FIG. 1A, FIG. 3 is a simplified diagrammatic showing of an apparatus for video imaging together a considerable number of consecutive sea bottom areas A, B, C, D, E, etc. irradiated as in FIG. 1A and FIG. 2 and gradually advancing the image as the vessel in FIG. 2 advances; conventional structural details are omitted;

FIG. 4 is a section taken on line 4—4 of FIG. 3 to show the relationship of the tape and the tape loop guide support in the apparatus shown in FIG. 3, FIG. 5 is a simplified diagrammatic showing of an apparatus for performing the functions of the apparatus shown in FIG. 3 but at a doubled flicker rate and with interlaced lines on the video display.

In FIG. 1A, there is shown part of a lengthy strip of sea bottom of width W, e.g., ten yards wide, delineated by imaginary lines, and divided into identical, thin, adjacent rectangular areas A, B, C, D, E, etc., transverse to the lengthy strip. In FIG. 1B, the lines A', B', C', D', E', etc., represent linear images of the bottom areas A, B, C, D, E, etc. In FIG. 2, there is shown a vessel 10 which carries an electroacoustic transducer 12 of a type capable of projecting pulses of sonic energy of selected frequency e.g., fifteen kilocycles per second, and selected beam angle $\theta$ measured outboard of the vessel with respect to the vertical and of very narrow beal width in the fore to aft direction. Between successive pulses the transducer 12 detects the echo returned from the sonified area A or B or C etc. The sonic apparatus may include one transducer for projecting and receiving or a transducer for projecting and a transducer for receiving. Each sonic pulse is radiated toward the entire area A or B or C, i.e., over the entire angle $\theta$ simultaneously, but the radiated sonic energy reaches the near end of the area first and then impinges on the area progressively further away until the furthest point P of the area is impinged by the sonic energy. An echo is returned from the irradiated area progressively from the near end to the furthest point P. Therefore, each echo is returned with range resolution as a function of time relative to the left side of the elongated area shown in FIG. 1A.

The minimum pulse repetition rate is selected so as not to interfere with the echo from the furthest part P of the irradiated area; in other words, the pulse period is no less than the time obtained by dividing twice the distance from transducer 12 to point P by the sound velocity in the water where the equipment is used. The forward speed of the vessel is set so that it traverses a distance substantially equal to the width of an irradiated area A, B, etc. during each pulse period; the width of the irradiated area is the beam width where it impinges the area. The apparatus shown in FIG. 3 includes a projecting and a receiving transducer 12A and 12B connected to pulse transmitter 14 and to receiver 16 respectively. Connection 18 conducts a gain reducing pulse or cutoff pulse from the transmitter to the receiver coincident with a radiated sonic pulse. A magnetic recording head 20, connected to the receiver 16, is mounted adjacent a magnetic tape 24 which is transported past the recording head 20 at a sutstantially constant rate by a tape feed reel 26, a takeup roll 28, idler rollers 30 and motor means not shown. Between the rollers 30, there is located a tape loop support guide 32 for edge supporting the tape as shown in FIG. 4 and having two identical rings 34 of non magnetic material secured together axially in line by a number of transverse straps 35 and permitting sensing and readout by a magnetic head 36. The rings 34 are secured fixedly and non rotatably by spokes 34'. The magnetic head 36 is mounted on a rotatable arm 38. Drive mechanism for the arm and electrical connections between readout head 36 and slip ring and brush assembly 39 are omitted. An electrical connection 40 extends from the slipring and brush, not shown, to video amplifier 42 and thence to a video display unit 44 having elements 46 and 48 for adjusting the horizontal and vertical sweep circuits. A vertical sync signal is obtained for each rotation of the arm 38 from a coil 50 wound on a stationary magnet 52, and an armature 54 that is secured to arm 38. The vertical sync pulse elements 50, 52, and 54 are arranged to deliver a sync pulse coincident with readout head 36 moving past one end of the tape loop on rings 34 or some point between the ends of the tape loop. If the tape is stationary and the arm 38 is rotated, the echoes from lines A, B, C, D, E etc. recorded on the loop can be displayed as a still picture on the video display unit 44.

From FIG. 2, it may be noted that from the instant a pulse of energy is radiated until an echo is returned from the bottom immediately below the transducer, no signal is recorded on the tape. During the remainder of the pulse period the echo is returned progressively from the near end to the far end of the sonified area and is recorded on the tape. In FIG. 2, the distance between the transducer and point P is shown as about twice the distance from the transducer down to the sea bottom. Under this condition a large percentage of the tape is blank. In most practical applications of this invention however, the ratio will be substantially more than twice and in addition the distance from the transducer 12 to the sea bottom directly below will be short since a major application of this invention is in or near harbor areas and near-in offshore areas. Under these operating conditions, the percentage of the tape that is blank is small. The change from no-signal to signal along the tape loop may be used to trigger the horizontal sweep circuit, a method that is well known.

The diameter of the ring-shaped tape loop support 34, the linear speed of the tape, and the number of lines on the video display are interrelated. The linear tape speed chosen is as slow as possible for conservation of tape; the lower limit of tape speed is determined by acceptable quality of the recorded signal. The diameter of the rings 34 is a function of the number of lines desired on the video display multiplied by the length of tape 24 for recording one line. The arm 38 completes a revolution, and the video display completes a vertical scan and the tape advances the equivalent of one recorded line during each pulse period. Therefore, in each successive vertical scan the image is displaced vertically the equivalent of one line. The image moves vertically on the video display at a rate corresponding to the forward motion of vessel 10 simulating the view that might be had of the bottom if one could look through a pipe in the bottom of the vessel directed at an angle toward the sea bottom and observe the bottom as the vessel moves forward at a constant speed.

In order to obtain a reasonably good image, on the order of 30 frames per second are necessary. In order that the pulse period be 1/30 sec., and assuming the speed of sound in the sea water where the equipment is used is 4500 feet per second, the depth and angle $\theta$ in FIG. 2 must be such that the maximum range from the transducer to point P is 75 feet. If a 15 kilocycle signal is used the high speed readout head 36 will deliver a 3.75 megacycle video signal which is amplified by video amplifier 42 and delivered to the video display unit 44. The number of lines per frame is a matter of choice but 250 lines per frame forms a good image.

In the above described technique, flicker may prove to be a problem at 30 frames per second or less particularly at high display brightness levels. Nevertheless, where the maximum range from the transducer to point P in FIG. 2 is substantially more than 75 feet, there must be less than 30 frames per second.

In FIG. 5 there is shown two identical recording and readout devices which are similar to the recording and readout device shown in FIG. 3. Structural elements identical to corresponding elements in FIG. 3 are identified by the same reference character followed by A or B for the respective recording and readout device. The tape takeup reels 28A and 28B and therefore, the tapes 24A and 24B are driven in synchronism by a motor means 29. The readout heads 36A and 36B are driven in synchronism by motor 29 and at a selected speed relationship with respect to the tape speed. The readout heads 36A and 36B are electrically connected in parallel to the input of video amplifier 42. The tape loop supports 34A and 34B and their associated guide elements 30A and 30B are arranged for substantially 180 degrees of tape wrap around the respective tape loop supports. The rotating head assemblies 36A and 36B are linked together in a relationship such that as readout head 36A just commences sensing the leading end of the 180 degrees of tape wrap on the tape loop support 34A, the readout head 36B just ceases sensing the trailing end of the 180 degrees of tape wrap on the tape loop support 34B. The recording heads 20A and 20B which are electrically connected in parallel to the output of the receiver are not stationary as is the head 20 in FIG. 3 but are mounted for reciprocation. A pair of cams 60 and 62 driven by motor 29 reciprocate the respective recording heads alongside their respective tapes. In FIG. 6 there is shown in broken lines the preferred reciprocatory motion of the recording heads as a function of time. However, it is impractical to cause the recording heads to reciprocate in a triangular motion as in FIG. 6 because of rapid acceleration involved at both ends of the excursion when the velocity changes direction. Advantage is taken of the dead time during which no echo is received, to round off the apices of the triangles; this time interval is also used for retrace time on the display tube. In FIG. 6 this is shown as 15 degrees out of 180 degrees. The solid line in FIG. 6 corresponds to the developed cam surface; though a triangular shape with rounded peaks may be used, a sinusoidal shape cam surface is shown as a more practical form for the cam. The horizontal sweep on the display tube may be made slightly nonlinear to correct for the slight nonlinearity of motion in the region between B and C and D and E shown in FIG. 6. The cam design and the ratio of tape speed and the velocity of the recording heads between B and C, and D and E is such that during approximately one-half each period one recording head moves at approximately the same speed as the respective tape and no recording takes place and the other recording head moves at approximately the same speed as the respective tape but in the opposite direction so that the latter head records. During the next half-period the record heads change direction and the reverse occurs. As a result all odd lines are recorded on one tape and all even lines are recorded on the other tape.

The function of the apparatus shown in FIG. 5 is better understood if compared to the function of the apparatus in FIG. 3 under comparable conditions. Assume that the apparatus shown in FIG. 3 is designed and adjusted for 250 lines per frame on the video screen and 30 pulses per second and that the apparatus shown in FIG. 5 is designed and adjusted for 251 lines per frame and 30 pulses per second. Under these conditions the tape speed in FIG. 5 is one-half that in FIG. 3 but the recording speed is the same as in FIG. 3 because recording takes place when the recording head moves in the direction opposite to that of the tape. The cam is driven to reciprocate the recording head at 15 cycles per second. Recording takes place during one-half each cycle of reciprocation of the cam, in 1/30 second. For any one frame, one-half the lines are obtained from tape 24A and are displaced as one field and one-half the lines are obtained from tape 24B and are displayed as the complementary field. Each cam is designed to displace the respective record head a peak-to-peak distance equal to 1/251 of the circumference of the tape loop supports. A trigger pulse mechanism 66 is driven by motor 29 to trigger the transmitter 30 times per second, i.e., at A and C in FIG. 6. The arms 38A and 38B complete two revolutions for each complete cycle of reciprocation of the cams. The tape speed and the speed of the recording heads between B and C and between D and E are substantially equal. Drive elements between the motor 29 and the tape transports, the cams, the recording heads and the trigger pulse mechanism 66 are omitted as a matter of design. The cams 60 and 62, arms 38A and 38B and the trigger mechanism are each relatively adjustable relative to their respective shafts by means of set screw devices or elements of like function, so as to enable proper phasing. Trigger pulses for the vertical sweep generator in the video display device 44 may be obtained as in FIG. 3, alternately from each of the rotating arms. The vertical sweep rate is twice the rotation rate of the readout heads. One or more lines may be lost due to finite vertical retrace time.

All of the odd lines of a picture are displayed on one field and all of the even lines are displayed on the next field. By using an odd number of lines on the video display device and by phasing adjustment of the readout heads and of the cams reciprocating the recording heads, an interlaced display in obtained.

In the apparatus shown in FIG. 5, one tape loop support and one readout head can be used. One arrangement contemplated within the scope of this invention is that the readout head be wide enough to extend over two tape widths and the tape loop support ring be made wide enough for supporting two separate 180 degree tape wraps 180 degrees apart and displaced axially so that the respective tape transports do not interfere, whereby the operation illustrated in FIG. 5 can be carried out with one tape loop support.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A recording apparatus for use in obtaining an interlaced video image from sonic echoes returned at a particular periodicity from successive transverse parallel thin approximately rectangular segments of an elongated strip area of approximately constant width and wherein each of the echoes is returned with range resolution relative to one side of said elongated area as a function of time comprising first and second tape transports including tapes, means for driving said tape transports so that the respective tapes move at equal and constant linear speed, a recording head mounted in cooperative relationship with each tape, means operable to displace periodically each recording head in opposite directions alongside its respective tape at twice the echo periodicity and at a speed whereby during a length of time equal to the echo period one recording head advances at substantially the same rate as its respective tape so that there is no significant relative motion therebetween and the other recording head retrogresses an equal distance and at substantially the same rate and at twice that rate relative to its tape, and in the succeeding length of time equal to an echo period, the two recording heads reverse direction, whereby only one recording head is recording on its respective tape at one time and whereby successive echoes may be recorded on alternate tapes, tape support and guide means for the respective tapes to support equal lengths of the respective tapes in semicircular loops, the tape loops together carrying a selected odd number of recorded echoes, readout means for sensing the semicircular tape loops, means for sweeping said readout means along the respective semicircular tape loops alternately and at equal speed.

2. A recording and display apparatus for use in obtaining an interlaced video image from sonic echoes returned at a particular periodicity from successive, transverse, parallel, thin, approximately rectangular segments of an elongated strip area of approximately constant width and wherein each of the echoes is returned with range resolution relative to one side of said elongated area as a function of time comprising first and second recording tape transports including tapes, means for driving said tape transports so that their respective tapes move at equal and constant linear speed, a recording head mounted in cooperative relationship with each tape, means operable to periodically reciprocate each recording head alongside its respective tape at twice the echo periodicity and at a speed whereby during a length of time equal to an echo period one recording head advances at approximately the same rate as its respective tape so that there is no relative motion therebetween and the other recording head retrogresses an equal distance and at approximately the same rate and at twice that rate relative to its tape, and in the succeeding length of time equal to an echo period the two recording heads reverse direction, for recording successive echoes on alternate tapes, and whereby only one recording head is recording on its respective tape at one time, a pair of substantially identical tape guide and support means for the respective tapes to support equal lengths of the respective tapes in semicircular loops, a readout head for each, means for rotating said readout heads in synchronism about the axes of the respective tape guide and support means and in a relationship such that as one readout head commences sensing engagement with the leading end of its respective 180 degrees of tape wrap, the other readout head terminates sensing engagement with the trailing end of its respective 180 degrees of tape wrap, a video display device having a frame period corresponding to the echo period and each frame having two fields, and each field having a number of lines corresponding to the number of echoes recorded on one semicircular loop of tape, means for coupling electric signals from both said readout heads to said video display device, means for generating a sync pulse coincident with each of said readout heads leaving sensing engagement with the trailing end of the respective semicircular tape loop, the relationship between the amplitude of reciprocating motion of the recording heads and the combined lengths of the semicircular tape loops being such that the total number of echoes per two succeeding fields is an odd number for producing an interlaced display.

3. An apparatus for scanning a sea bottom area comprising a waterborne mobile platform capable of moving at a constant velocity in a horizontal direction, means on said platform for periodically projecting sonic pulses of a selected frequency, of narrow beam width in the mobility direction of said platform, and of selected beam angle measured from a vertical at the origin of said pulses outward of said platform in a direction transverse to the mobility direction of said platform, and for receiving the echoes of said periodic pulses returned from the bottom, first and second recording tape transports including tapes, means for driving said tape transports so that the respective tapes thereon are moved at equal and constant linear speed, a recording head mounted in cooperative relationship with each tape, means operable to periodically reciprocate each recording head alongside its respective tape at twice the echo periodicity and at a speed whereby during one-half each period one recording head advances at approximately the same rate as its respective tape so that there is no relative motion therebetween and the other recording head retrogresses an equal distance and at approximately the same rate and at twice that rate relative to its tape and in the succeeding length of time equal to an echo period the two recording heads reverse direction, for recording successive echoes on alternate tapes, whereby only one recording head is recording on its respective tape at one time, a pair of substantially identical tape guide and support means for each of the tape transports to support equal lengths of the respective tapes in semicircular loops, a readout head for each of the tape guide and support means, means for rotating said readout heads in synchronism about the axis of the respective tape guide and support means and in a relationship such that as one readout head commences sensing engagement with the leading end of its respective 180 degrees of tape wrap, the other readout head terminates sensing engagement with the trailing end of its respective 180 degrees of tape wrap, a video display device having a frame period corresponding to the echo period and each frame having two fields, and each field having a number of lines corresponding to the number of echoes recorded on one of said semicircular loops of tape, means for coupling electric signals from both said readout heads to said video display device, and means for coupling a sync pulse to said video display device coincident with each of said readout heads leaving sensing engagement with the trailing end of the respective semicircular tape loop.

4. A method of sea bottom strip mapping comprising locating a waterborne equipment platform at a selected distance above an area of sea bottom to be mapped which area is approximately level and moving the platform at a substantially constant velocity at said selected distance above the sea bottom, periodically projecting downward from the platform to the sea bottom a pulse of sonic energy of selected frequency, of selected beam angle measured from the vertical laterally to the direction of motion of the platform, and of narrow beam width in the direction of platform velocity, the pulse period and the time required for the platform to move a distance equal to the width of each sonified area of sea bottom being approximately equal, the beam angle and the velocity of the platform being correlated so that when the end of an echo is returned from the sonified area of sea bottom, the platform has moved forward a distance approximately equal to the width of the sea bottom area sonified by the pulse, recording successive odd and even echoes of said pulses along separate record tracks, video imaging alternately a selected number of the odd echoes and the corresponding even echoes as an interlaced display, and advancing the interlaced display by advancing one echo per image in correspondence to the advance of the platform over the sea bottom each pulse period.

5. A recording apparatus for use in obtaining an interlaced video image from sonic echoes returned at a particular periodicity from successive transverse parallel thin approximately rectangular segments of an elongated strip area of approximately constant width and wherein each of the echoes is returned with range resolution relative to one side of said elongated area as a function of time comprising first and second tape transports, a tape support and guide means for each of the tape transports, defining a tape path having a straight portion and a semicircular loop portion, the two semicircular loop portions of the respective tape paths being of equal length, means for driving said tape transports at equal and constant speed, a recording head for each tape transport, means for reciprocating each recording head alongside the straight portions of the respective tape paths for recording alternately along their respective tape paths, tape readout means for each of the semicircular loop portions of the respective tape paths, means for driving the readout means so that they transverse their respective semicircular portions of the tape paths alternately and at a speed such that both readout means complete one traverse each of their respective semicircular tape path portions in the same length of time that each of said recording heads completes a recording traverse of the straight portion of the respective tape path.

6. Apparatus as defined in claim 5 further including video means for displaying successive readouts as interlaced images.

References Cited in the file of this patent
UNITED STATES PATENTS

| | | |
|---|---|---|
| 2,378,383 | Arndt | June 19, 1945 |
| 2,892,666 | Parker et al. | June 30, 1959 |
| 2,903,521 | Ellison | Sept. 8, 1959 |
| 3,005,973 | Kietz | Oct. 24, 1961 |